Figure 1:
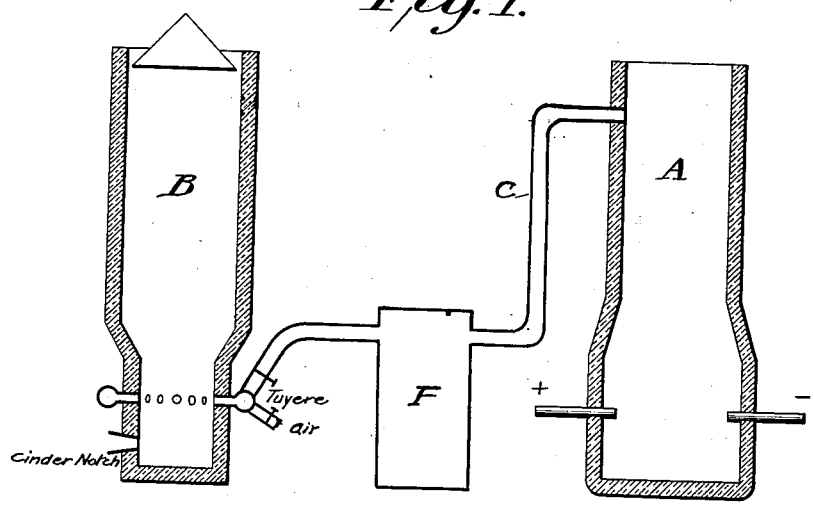

J. J. W. H. VAN DER TOORN.
PROCESS FOR THE TREATING OF TITANIFEROUS IRON ORE.
APPLICATION FILED MAR. 25, 1918.

1,334,004.

Patented Mar. 16, 1920.

Inventor
J. J. W. H. Van der Toorn
By Byrnes Townsend Brickenstein
Attorneys

UNITED STATES PATENT OFFICE.

JACOBUS JAN WILLEM HENDRIK VAN DER TOORN, OF THE HAGUE, NETHERLANDS, ASSIGNOR TO INDUSTRIE & MIJNBOUW MAATSCHAPPIJ "TITAN," OF THE HAGUE, NETHERLANDS.

PROCESS FOR THE TREATING OF TITANIFEROUS IRON ORE.

1,334,004.   Specification of Letters Patent.   Patented Mar. 16, 1920.

Application filed March 25, 1918. Serial No. 224,695.

*To all whom it may concern:*

Be it known that I, JACOBUS JAN WILLEM HENDRIK VAN DER TOORN, subject of the Queen of the Netherlands, residing at the Hague, Kingdom of the Netherlands, have invented certain new and useful Improvements in Processes for the Treating of Titaniferous Iron Ore, of which the following is a specification.

My invention consists in a new method for producing metallic iron such as pig iron, cast iron, foundry iron and the like from titaniferous iron ore, for example titaniferous sand.

There are already methods known in practice, in which metallic iron such as pig or cast iron is produced from titaniferous iron ores, by submitting the said ores in the presence of reducing bodies such as carbon and flux, to the action of the electric flame arc. With these known methods the flux and the carbon are employed in finely divided state.

The technical result attained by these methods consists therein that the titaniferous iron oxid is decomposed into titanic acid anhydrid ($TiO_2$) and ferric oxid, whereafter, for the purpose of obtaining iron free from titanium the titanic acid anhydrid is slagged or scorified by means of the base present in the mass; and the ferric oxid under the action of the carbon is converted into metallic iron.

The present invention is a further development of and an improvement on these known methods and consists in the following:

(1) That contrary to the methods applied hitherto, according to the present invention, the titanic iron ore, the carbon serving for the reduction of the ore, and the flux, are mixed with each other in a finely divided state and thereafter transformed into briquets;

(2) That the process of reduction of the titaniferous iron ore is carried out in two consecutive operations in such a manner that one part of the total charge composed of titaniferous iron ore, the carbon and the limestone flux in briqueted or non-briqueted form is subjected to the action of the electric flame arc, the practically non-diluted gases developed in the electric flame arc being conducted to a combustion furnace, such as a blast furnace, where they are applied to the smelting of the charge contained therein. An essential point of the present invention is the exposure in the combustion furnace to a reducing action of the entire briqueted charge consisting of titaniferous iron ore, carbon and flux which has been finely ground, mixed and agglomerated.

(3) That the gases required and used for the melting of the charge in the shaft or blast furnace in connection with the said divided process, are produced during the melting of the one part of the charge in an electric flame arc.

Figure 2:
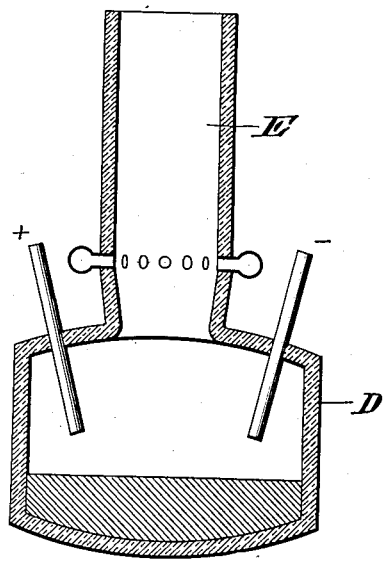

Suitable apparatus for carrying out the process is shown in the accompanying drawings in which Figure 1 is a longitudinal section of one form of apparatus; and Fig. 2 is a modification thereof.

As shown in Fig. 1 the apparatus is composed of separate electric and combustion furnaces, A and B, a preheater F and a conduit C for conducting the gases developed in the furnace A through the preheater F into B to assist in the combustion process. In Fig. 2 the combustion and electric furnaces are combined producing an integral structure. One portion of the ore is smelted in the electric furnace D and the other in the shaft furnace E, the gases developed in the former passing into the latter to react with the charge.

It has been found that if the titaniferous iron ore to be reduced, and the carbon serving for the reduction and the flux (limestone flux) are transformed into a finely divided state, mixed with each other to a homogeneous mass, and pressed into briquets a more uniform, quicker and intense action of the reducing body (carbon) and of the flux on the individual parts of the titaniferous iron ore is obtained due to the homogeneity of the said mixture.

By submitting these briquets in an electrical flame arc or in a combustion furnace to reduction, due to the intimate action of the reducing body (carbon) and of the flux on the individual parts of the titaniferous iron ore, that is on the components forming same, (the said components consisting of titanic acid anhydrid and of ferrous or ferric oxid compounds), a most perfect and complete extraction of pure iron is obtained.

From the foregoing it is seen that the first improvement, forming one of the characteristic features of the present invention, consists therein, that the titaniferous iron ore to be reduced, the reducing agent (carbon) and the flux (limestone flux), converted into a finely divided state, are intimately mixed with each other and transformed into briquets to form a fixed, uniform and coherent body, after which the briquets are exposed to the action of high temperatures producing iron in metallic state.

By the use of the said components briqueted with each other, material advantages are obtained.

In case the said components, namely the titaniferous iron ore (titaniferous iron sand), the reductive body (carbon) and the flux (limestone flux) are charged into a combustion or electric furnace, in a non-briqueted state, the titaniferous iron ore is only partly reduced and converted into metallic iron, while the other part of the iron present in the titaniferous iron ore remains in the slag. This detrimental effect is due to the fact, that the carbon remains on the surface of the molten charge, and therefore effects its reducing action most incompletely.

Applied to the shaft or blast furnace a still more detrimental effect is produced in that the finely ground iron ore, that is to say the titanic sand or the artificially finely granulated titaniferous iron ore is blown out of the furnace, through the throat.

These inconveniences are removed by the application of the titaniferous iron ore with the reductive body and the flux in a permanent agglomeration with each other.

Another novelty according to my present invention consists in the following:

The reduction of the titaniferous iron ore can, as generally known, only be effected at high temperatures. For carrying out the said reduction I employ shaft furnaces which are heated with gas. Now the novelty characterizing this part of my invention consists therein, that the quantity of gas required for the heating of the shaft or blast furnace or of the producer (generator stove) is obtained from the reduction of one part of the titaniferous iron ore in an electric arc furnace. The gases developed in the said arc furnace are conducted into shaft furnaces or producers heated by gas, and employed to reduce the titaniferous iron ore contained therein.

Due to the fact that the carbon monoxid developed during and by the said electric reduction is obtained in a non-diluted state, in consequence whereof the whole of the gas produced is combustible, the introduction and use of same in the shaft furnace effects a considerable increase of the heating effect of the combustible and a saving in fuel, the entire process being rendered more economical.

The great advantage obtained by this system can be realized by the simultaneous use of a number of electric arc furnaces for the reduction of the finely pulverized and finely divided components of the briquets hereinbefore described and by the introduction of the gases developed in the said electric arc furnaces consisting almost in their totality of carbon monoxid gases, into the shaft or blast furnace, suitably connected with the said electric flame furnaces.

By employing the said gases in the shaft or blast furnace a considerable addition to the heating effect of the coal and an increasing of the heat in the said furnace is attained and the metallurgical process is rendered considerably more economical.

A third novel feature of my invention rendering the process still more economical, consists in the production of gas in limited quantities only, as are necessarily required in the shaft or regenerative furnace for effecting the melting of the charge; that is, in the electric furnace the production of combustible gases (carbon monoxid gas) is carried to such extent only, as is required for rationally improving or increasing the heating in the shaft or blast furnace, while the remainder of heat necessary for effecting the reduction of the briqueted charge, is obtained by charging the furnace with coke.

In the manufacture of the briquets the following is important:

The mixing of the titaniferous iron ores, the reducing agent (coal or coke) and the flux (limestone), forming the briquets, is effected in that proportion of these components to each other, at which, considering the chemical constitution of the titaniferous iron ore, the reduction or smelting process can be carried out with the best result and the highest extraction.

This proportion is established in every individual case, after preliminary testing of the titaniferous iron ore to be treated.

The gases produced in the electric arc furnace and conducted into shaft or blast furnaces, may, if necessary, be preheated for the purpose of raising the melting action.

Finely divided titaniferous iron ore, exposed to high temperatures, such as the electric flame arc, is, as generally known, decomposed into: (1) titanic acid anhydrid ($TiO_2$) whereby either (2) ferric oxid ($Fe_2O_3$) or (3) ferroso-ferric-oxid ($Fe_3O_4$)

is simultaneously formed. When the heating of these bodies is continued in the electric flame arc, a further decomposition of the iron oxid composition is produced, whereby ferrous oxid is formed while oxygen is liberated.

The chemical reaction which takes place, is the following:

(1) $CaCO_3 = CaO + CO_2$
(2) $CO_2 + C = 2CO$
(3) $Fe_2O_3 + 3CO = 2Fe + 3CO_2$
(4) $Fe_3O_4 + 4CO = 3Fe + 4CO_2$
(5) $Fe_2O_3 + 3C = 2Fe + 3CO$
(6) $Fe_3O_4 + 4C = 3Fe + 4CO$.

For the purpose of producing metallic iron, the formation of alloys containing titanium must, as it is known, be avoided.

For this purpose, the titanic acid anhydrid is scorified by the base employed.

By the addition of flux of any suitable kind, immediately during the melting process, pig iron or cast iron of different composition can be obtained.

In case the manufacture of pig iron or cast iron is intended, containing a certain percentage of titanium, this can be obtained by addition of calcium fluorid to the ore to be reduced.

The following is an example of the mode of execution of the process according to my invention, in which the necessary quantities of the reductive body (carbon) and the flux (limestone flux) are each calculated with relation to 1000 grams titaniferous iron ore.

The calculation is based on the supposition that the analytical test of the titaniferous iron ore to be treated, shows the following constitution:

69 % $Fe_2O_3$ or $Fe_3O_4$
12.7% $TiO_2$
9.3% $SiO_2$
1.2% $CaO$
3.6% $MgO$
3.5% $Al_2O_3$
0.7% $MnO$.

(*a*) Calculation of the quantity of coal required for the reduction:

1000 grams titaniferous iron ore contain 690 grams $Fe_2O_3$ or $Fe_3O_4$; for the chemical combination or chemical binding of the oxygen there are required: in the one case $$4.3 \times 3 \times 12 = 155 \text{ gr. C},$$

in the other case $$3 \times 4 \times 12 = 144 \text{ gr. C},$$

or as an average 149.5 gr. C.

(*b*) Calculation of the quantity of the flux required:

The quantity of the flux required for the chemical combination or binding of silicic acid ($SiO_2$) not eliminated by mechanical treatment, can be determined in the same way:

1000 grams titaniferous iron ore contain, according to the analytical test above given, and on which this calculation is based:

93 grams $SiO_2$ 93:60=1.55 mol. $SiO_2$.

From these for the purpose of the chemical binding there are required:

1.55×2=3.1 mol. base.

1000 grams ore contain: 12 grs. CaO, 36 grs. MgO, 35 grs. $Al_2O_3$, 7 grs. MnO.

12 grs. CaO or $\frac{12}{56} = 0.21$ mol.

36 grs. MgO or $\frac{36}{40} = 0.9$ mol.

35 grs. $Al_2O_3$ or $\frac{35}{103} = 0.34$ mol.

7 grs. MnO or $\frac{7}{71} = 0.1$ mol.

1000 grams titaniferous iron ore contain therefore 1.55 mol. base and in order to bind the $SiO_2$, there must be added 3.1−1.55 mol. base.

In the same way there can be calculated and established that 1000 grams lime contain 0.985 mol. base and that for the chemical binding of the silicic acid there must be added 1.55×0.985×100=153 grams $CaCO_3$ for each 1000 grams of ore.

In the same way there can finally be calculated the quantity of the base $CaCO_3$ required for the chemical binding of the liberated titanic acid anhydrid ($TiO_2$).

I claim:

1. Process for the manufacture of metallic iron such as foundry-iron, pig iron, cast iron and the like, from titaniferous iron ores, consisting in grinding the titaniferous iron ores (titan iron sand), the reductive body (coal) and the flux (limestone flux) to a finely divided state, converting the same into briquets, and submitting the briquets to reduction, for the purpose of attaining a direct action of the reductive body and of the flux on the molten titaniferous iron ore and for converting the totality of the iron present in the ore into metallic iron.

2. Process for the manufacture of metallic iron, such as foundry-iron, pig iron, cast iron and the like, from titaniferous iron ores, which consists in the division of the reduction process in two consecutive operations, in such way, that one part of the titaniferous iron ore is being reduced in the electric furnace, while the other part is being molten in the shaft furnace, in the presence of those not diluted combustible gases CO (carbon monoxid) obtained during the reduction of ores in the electric furnace.

3. Process for the manufacture of metallic iron, such as foundry-iron, pig iron, cast iron and the like, from titaniferous iron ores, consisting in obtaining the gas required for the melting of the titaniferous iron ore in the shaft or blast furnace from the products of combustion developed by the melting of one part of the charge in an electric furnace.

4. Process for the manufacture of metallic iron, such as foundry-iron, pig iron, cast iron and the like, from titaniferous iron ores, consisting in manufacturing only such quantities of gas in the electric furnace, as are required for production of the temperatures necessary to melt the other part of the charge in the shaft or blast furnace, while obtaining the additional heat required in the shaft or blast furnace by charging the same with coke.

5. Process for the manufacture of metallic iron, such as foundry-iron, pig iron, cast iron and the like, from titaniferous iron ores, consisting in the manufacture of non-diluted combustible gases (CO) by the reduction of titaniferous iron ores in an electric furnace and the conduction of these gases into the shaft or blast furnace for the purpose of reducing the titaniferous iron ores therein contained, whereby either in both the electric furnace and in the shaft or blast furnace, or in the shaft or blast furnace alone, the titaniferous iron ore to be reduced and the reductive body (C) and the flux (limestone flux) are employed in finely divided, intimately mixed, but briqueted state.

6. Process for the manufacture of métallic iron, such as foundry-iron, pig iron, cast iron and the like, from titaniferous iron ores. consisting in the manufacture of non-diluted combustible gases (CO) by the reduction of titaniferous iron ores in an electric furnace and in the conduction of these gases into the shaft or blast furnace for the purpose of reducing the titaniferous iron ores therein contained, whereby either in both the electrical arc furnace and in the shaft or blast furnace, or in the shaft or blast furnace alone, the titaniferous iron ore to be reduced and the reductive body (C) and the flux (limestone flux) are employed in finely divided, intimately mixed, but briqueted state, in combination with the introduction of preheated gases into the shaft or blast furnace for improving the melting process and in order to cause by using the briqueted form, a direct action of the reductive body on the titaniferous iron ore to be melted.

7. In the process of reducing iron from titaniferous iron ores, the step consisting in reducing the ore in a combustion furnace in the presence of the gases developed in an electric furnace.

8. The process of reducing iron from titaniferous iron ores consisting in charging portions of the ore into different furnaces and conducting a portion of the gases developed in one of said furnaces into the other to aid in reducing the charge therein.

9. The process of reducing iron from titaniferous iron ores consisting in charging portions thereof into the combustion furnace and electric furnace of a combined combustion electric furnace, and smelting the charge in the combustion furnace in the presence of the gases developed in the electric furnace.

10. The process of reducing iron from titaniferous iron ores consisting in briqueting the ore with a suitable flux and reducing agent, dividing the charge into two portions, smelting one portion in an electric furnace and the other in a combustion furnace, and introducing a portion of the gases developed in the electric furnace into the combustion furnace to aid in reducing the charge therein.

11. The process of reducing iron from titaniferous iron ores consisting in briqueting the ore with a suitable flux and reducing agent, charging portions thereof into separate furnaces and conducting a portion of the gases developed in one of said furnaces into the other to aid in reducing the charge therein.

12. The process of producing iron from titaniferous iron ores consisting in grinding the titaniferous iron ore, a reducing agent and a fluxing agent to a finely divided state, converting the same into briquets and smelting the briquets whereby metallic iron and a slag low in iron is obtained.

In testimony whereof I have affixed my signature in presence of two witnesses.

JACOBUS JAN WILLEM HENDRIK van der TOORN.

Witnesses:
  A. Claude Houghton,
  Henry N. Benoit.